United States Patent [19]
Adachi

[11] 4,154,257
[45] May 15, 1979

[54] FLOW-DIVIDER REGULATOR

[75] Inventor: Yoshiharu Adachi, Gamagori, Japan

[73] Assignee: Aisin Seiki Kabushiki Kaisha, Kariya, Japan

[21] Appl. No.: 771,659

[22] Filed: Feb. 24, 1977

[30] Foreign Application Priority Data

Feb. 26, 1976 [JP] Japan ................................. 51/20858
Mar. 31, 1976 [JP] Japan ................................. 51/35489
Aug. 6, 1976 [JP] Japan ................................. 51/94168

[51] Int. Cl.$^2$ ......................................... G05D 11/03
[52] U.S. Cl. ..................................... 137/101; 60/422
[58] Field of Search ........................... 137/101; 60/422

[56] References Cited
U.S. PATENT DOCUMENTS

3,421,532  1/1969  Davidson .............................. 137/101
3,924,650  12/1975  Parquet ................................. 137/101

Primary Examiner—Robert G. Nilson
Attorney, Agent, or Firm—Burns, Doane, Swecker & Mathis

[57] ABSTRACT

A flow divider regulator valve adapted to the vehicle hydraulic system comprising a housing and a bore within which a plunger is slidable dividing the latter into first and second chambers. The valve further comprises orifice means to permit metered flow between the chambers. The first chamber is connected with the pump and one outlet while the second chamber is connected to the other outlet. The orifice means provides means to divide the pump flow in a suitable ratio for providing a regulated portion and another remaining portion.

9 Claims, 5 Drawing Figures

FLOW-DIVIDER REGULATOR

BACKGROUND OF THE INVENTION

This invention relates to a flow-divider regulator, also sometimes called an unloading valve, for use in a hydraulic system for a vehicle to enable its use with open-center and closed-center control valves and apparatus.

As is well known in the art, the flow divider of this type operates to divide a single pump discharging flow in a suitable predetermined ratio and provides for the smaller regulated portion of flow to be delivered to a hydraulic system which might be such a thing as the known-power braking booster, while the major unregulated remaining portion of the pump flow continues to pass through the other system, such as for example, the known open-center power steering gear valve, and the operation of either system does not affect the behavior of the other.

In the use of the flow divider, a relief valve is needed to be equipped on a discharging line from the pump for safeguarding the pump against the possibility of ruin due to an unrestricted increase in pressure within its discharging line, when the hydraulic systems are extremely actuated to thereby stop fluid flow therethrough followed by the unrestricted pressure rise in the discharging line.

Contradictorily to the intended character of the relief valve, the same should be normally held inactive in order to maintain at least continued remaining pump flow portion to one of the systems, even though the other regulated flow ceases owing to an extreme actuation of the other system causing an increase in pressure as would open the relief valve. This is required for safety purpose, since the real action or opening of the relief valve will result in escaping of the pump flow rather into the reservoir than the said one of the systems.

In order to keep the relief valve inactive or closed for preserving a continued flow of the major portion, in case of the cessation of flow, it has been the practice in the art that an additional or second relief valve is further provided on the regulated pump flow line for the sake of limitation of pressure rise therein to a lower level than that predetermined by the first relief valve, so that the major remaining pump flow is ensured through the said one of the hydraulic systems.

The provision of the additional relief valve is considered to be a defect in that, it would represent a substantially greater cost owing to a resulting structural complication.

A solution is now demanded to provide means for avoiding necessity of the second or additional relief valve on the regulated pump flow line leading to the said other system.

SUMMARY OF THE INVENTION

A principal object of the invention is to provide an improved hydraulic flow divider regulator to divide a single pump flow in a suitable predetermined ratio so as to provide for a smaller regulated portion and the major remaining portion without necessity of any additional relief valve means on the regulated flow line.

The foregoing object and others are attained according to at least one aspect of the present invention through provision of means for continuing the flow of the major portion under a pressure at a lower level than that predetermined by the relief Thus in the embodiments, there are comprised, a housing having a fluid inlet, a first and second outlets, a bore communicating the inlet with the outlets, and a plunger closely fitting and slidable in the bore dividing the latter into first and second chambers. The inlet and the first outlet are in fluid communication with the first chamber and the second outlet is in fluid communication with the second chamber. The embodiments further comprise orifice means permitting metered flow of fluid from the first chamber to the second chamber and a pair of valve means on the plunger to alternately permit fluid communication between said inlet and said first outlet across the first chamber and across the orifice means respectively, and a third valve means on the plunger in front of the second outlet.

DESCRIPTION OF THE PREFERRED EMBODIMENTS

Figure 1:
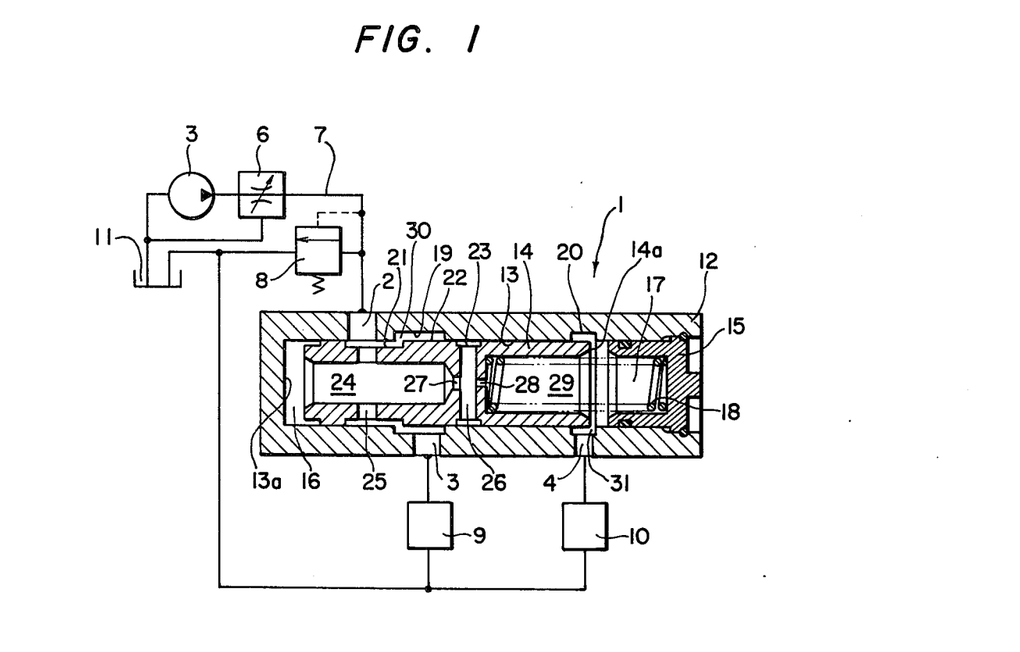
FIG. 1 shows a somewhat schematic longitudinal cross section of the regulator valve according to the invention; connected into a diagrammatically represented hydraulic systems for a vehicle.

Referring now to FIG. 1, the flow divider according to the invention generally designated by the numeral 1 has at the upper left an inlet port 2 which is connected through the line 7 to the port of the pump P. The pump discharge line 7 is connected through a by-pass control relief valve 8 with the suction pipe of the pump leading to a reservoir 11 for maintaining maximum of the pressure of the fluid in the discharge line 7 at a predetermined level. The body 12 has at the lower right an outlet port 4 for delivering a controlled fluid flow and at the lower left an outlet port 3 for delivering the major remainder portion of the pump flow. The pump port 2 is shown as forming the mouth of a valve bore 13 which contains, in close fitting slidable relationship, a valve plunger 14 of generally tubular shape having two oppositely opened internal recesses 24 and 29. The recess 29 receives one end of a calibrated control spring 18, the other end of which is seated in a plug 15 enclosing the bore 13 at the right extremity. The recess 24 forms a chamber 16 in cooperation with the bore 13 and the other recess 29 forms another chamber 17 in cooperation with the bore and the plug 15. The two recesses are separated by a central wall through which a radial bore 26 is formed with its both ends opening in an annular groove 23 in the external face of the plunger 14. The radial bore 26 is connected through a small bleed orifice 27 with the left chamber 16 and also through a second orifice 28 with the spring containing cavity 17. The compressed and calibrated spring 18 normally urges the spool or plunger 14 to the left against a pressure differential created between the chambers across the duplicated orifices 27 and 28. The plunger occupies the position shown upon a pressure differential between the chambers as being separated from the internal end face 13a of the bore 13.

In the internal face of the bore 13 are a pair of separated annular recesses or grooves 19 and 20. The groove 19 is in fluid communication with the outlet port 3 while the other groove 20 is connected with the other port 4. In the external face of plunger 14 are two separated annular grooves 21 and 23 for forming a land 22 therebetween. The groove 21 is connected through passages 25 with the axial bore 24 while the other groove 23 is connected with the radial bore 26. The annular groove 19 and the land 22 form in cooperation a variable orifice valve 30 at their right-angled shoulder portions. The other groove 20 and the end 14a of the plunger 14 also form another variable orifice valve 31. In case where the plunger 14 occupies the other position shown in FIG. 1a, the third variable orifice valve 32 is provided as shown, by the land 22 and the groove 19. The port 3 is connected through the manually controllable and fluidly actuatable system 9, such as for example, a power steering device with the reservoir 11 as shown by the full line in FIG. 1 and the other port 4 is connected through the similar device 10 which might be such a thing as the known power braking booster with reservoir 11.

The pump 3 produces a flow of fluid, which is regulated by an ordinary flow regulator valve 6 to be discharged into the flow divider 1. The flow of fluid enters through the inlet port 2 into the housing 12 and is discharged from the outlets 3 and 4 and in turn passes through the devices 9 and 10 to the reservoir 11 as will be discussed in greater detail hereinbelow. The flow is normally not pressurized until power braking function and/or power steering function is required and either one or both of the devices 9 and 10 are actuated, causing the valve in them to restrict pump flow and thereby increase the pressure in them.

In the absence of discharging flow from the pump 3, the plunger 14 abuts at its left end against the end 13a of the bore 13. When pump 3 is in action, the plunger 14 moves to the right against the calibrated spring 18 to the position shown in FIG. 1 is dependent upon a pressure drop created across the diametrically smaller orifice 28 by the flow therethrough. The diametrically larger orifice 27 is not substantially in action in this position as will be further described in greater detail hereinafter. The orifice 28 is so sized that fluid flow therethrough will create a pressure drop such that the pressure on the left-hand side of the orifice 28 exceeds the pressure in the spring-containing cavity 17 sufficiently to exert a force on the area of plunger 14 which exceeds the installed load of the spring 18 and the plunger 14 will therefore move to the right. In the position shown in FIG. 1, a more or less closely regulated small flow will continue through the second passageway containing port 2, annular groove 21, drilled passages 25, bore 24, orifices 27 and 28, bore 29, chamber 17, and outlet port 4, permitting the major remainder of the pump flow to continue through the first passageway containing port 2, annular grooves 21 and 19, and outlet 3. The flow divider 1 thus operates to divide the pump flow in a suitable predetermined ratio and provides for the smaller regulated portion of flow to be delivered through the outlet port 4 while the major remaining portion of the flow continues to pass through the outlet 3, and it should be understood that operation of either device does not in any way affect the behavior of the other as described in greater detail hereinafter.

If the hydraulic power steering device 9 is actuated, causing restriction in the flow therethrough, pressure will rise in chamber 16 and the increase in pressure will have a tendency to increase the flow through the orifice 28. This increased flow results in increased pressure drop, which will cause the plunger 14 to move further to the right until it partially covers the annular groove 20 by the end 14a and adds sufficient restriction to the flow to maintain the predetermined quantity therethrough. The added restriction will accordingly cause the corresponding increase in fluid pressure in the chamber 17 so that the same pressure drop or differential as the former one results between the opposite sides of the orifice 28. Thus it will be seen that regardless of whether the power steering system 9 is used or not a more or less closely regulated small flow will continue through orifice 28, due to a predetermined pressure drop dependent upon an installed load of spring 18.

In case where the valve in device 9 is usually or extremely actuated, the resulting extreme restriction in flow will cause the pressure in pump flow rise up to the maximum predetermined by the relief valve 8. The relief valve 8 therefore opens to permit the restricted portion of pump flow to escape into the reservoir 11. In that situation, the pressure drop which existed across the orifice 28 just prior to this situation will still yet continue. The predetermined quantity of flow is therefore maintained through the orifice 28, namely through the port 4 to the system 10. In other words, it may be mentioned incidentally that the escaping quantity from the relief valve 8 is generaly in accord with one which is additionally obstructed by the system. Therefore, a cessation of pump flow through the port 3 will result from the opening of the relief valve 8. However, with the pressure rise in pump flow to the maximum, the system 9 having substantially completed the intended performance of operation, any fears that the device 9 is inoperable due to the cessation of flow will be alleviated.

In case where the other device 10 is actuated regardless of whether the system 9 is in action or not, pressure will rise in chamber 17 and increase in pressure will have a tendency to momentarily decrease the pressure drop between the opposite sides of the orifice 28. This decrease in the pressure drop causes the plunger 14 to move leftward a slight distance due to the load of the spring 18 to cover further the annular groove 19 by land 22. A pressure rise in chamber 16 accordingly in proportion to the rise in pressure in chamber 17. The predetermined pressure drop is therefore maintained in accord with the former one. In other words, it may be described that the predetermined quantity of fluid flow is maintained through port 4.

Figure 1A:
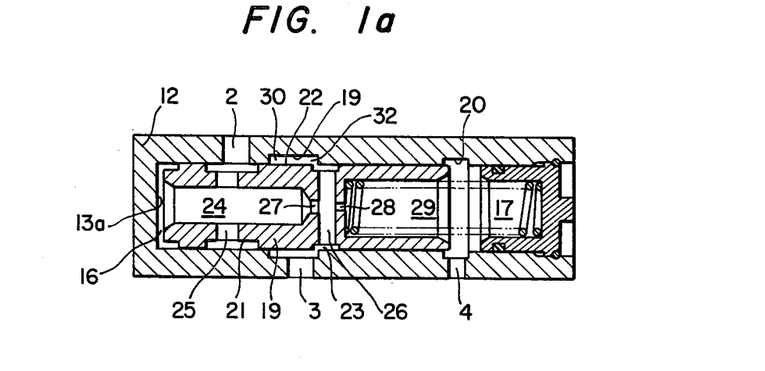
FIG. 1a is an axial cross sectional view of the flow divider shown in FIG. 1, showing a different position from that of FIG. 1.

If the device 10 is so extremely actuated that flow therethrough stops, the resulting pressure rise in chamber 17 decreases the pressure drop across the orifice 28. The spring 18 therefore forces the plunger 14 to move to the left into opening of the variable orifice valve 32 as seen in FIG. 1a. The other variable orfice valve 30 is closed in timed relation with the valve 32 as seen and the pump flow thereafter passes through the following passageway containing, port 2, orifice 27, bore 26, annular groove 23, variable orifice valve 32 and groove 19 to the port 3. Because of fluid flow through the orifice 27, a pressure drop is created across the orifice 27, whereas no pressure drop exists across the other orifice 28 because of cessation of flow through port 4, namely the orifice 28. It follows that a flow through the orifice 27 will create a pressure difference such that the pressure in chamber 16 exceeds that in the spring containing chamber 17 sufficiently to exert a force on the area of plunger 14 which is proportional to the installed load of the spring to thereby maintain the predetermined quantity in the flow through the orifice 27 and in turn the port 3, sufficiently to actuate the device 9.

It may be summarized further that even though the device 10 is so extremely actuated that the flow therethrough ceases, a regulated flow will continue through outlet port 3 sufficiently to actuate the other system 9. This is a significant function of the flow divider according to the invention. Because of the function, no relief valve is needed to provide on a conduit connecting the port 4 and the device 10 in order to ensure a continued and closely regulated flow through port 3 by preventing the relief valve 8 from opening. It should be noted that if the required quantity of flow for the device 9 in this situation is identical with one for the other device 10 in its normal actuation, both orifices will be of identical size and therefore the orifice 28 may be abbreviated in design. While the embodiment as hereinbefore described constitutes a preferred form in which two different size orifices are provided to be employed in each, it is to be understood that other forms might be adopted with a single orifice to be employed for either of the devices.

Further it is to be understood that by selection of a size of the orifice 27, a predetermined flow is available through a port 3, regardless of whether the flow passes past the orifice 27 or not.

Figure 2:
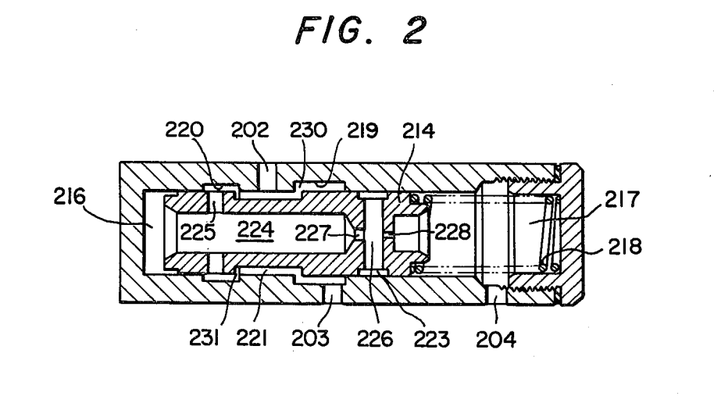
FIG. 2 is a cross sectional view of a different embodiment of the invention.

In FIG. 2 is shown another embodiment of the invention. Parts similar to those shown in FIG. 1 are designated by the same numerals in 200 series so that duplicated description will be abbreviated for understanding the embodiment.

In case of the unusal extreme actuation of the device connected to port 204, the flow through port 204 momentarily ceases. The plunger 214 therefore is moved to the left by the spring 218 due to the resulting decrease of pressure drop across the orifice 228. The variable orifice 231 therefore opens further and both grooves 219 and 223 becomes communicated with each other while the other variable orifice valve 230 becomes closed. A passageway for fluid is accordingly provided through port 202, annular grooves 221 and 220, drilled passage 225, bore 224, orifice 227, bore 226, grooves 223 and 219 to port 203. It will be understood that even though flow through port 204 ceases, a more or less closely regulated small flow will continue through orifice 227 to the other port 203 in the same manner as that of the first embodiment.

In the embodiment in FIG. 2, location of the variable orifice valve 231 is at the left of the housing, whereas the corresponding variable orifice valve 31 in FIG. 1 is located at the right subsequent to the orifice 28. With the difference of location, it should be noted that the same result is obtained.

Figure 3:
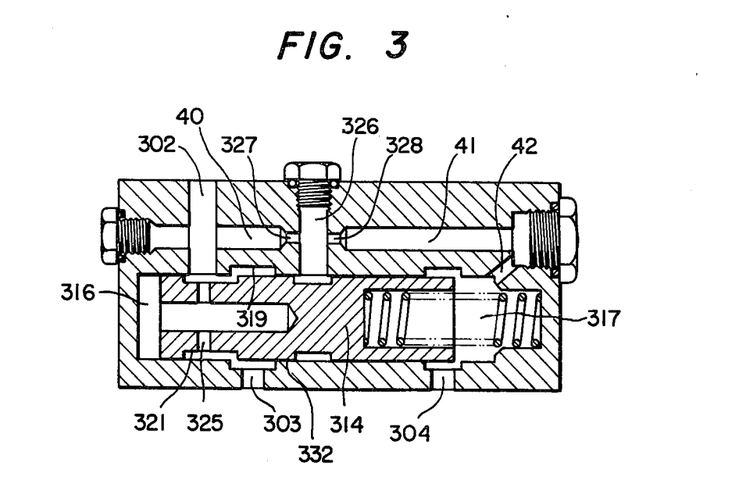
FIG. 3 is a cross sectional view of a still another embodiment of the invention.

In FIG. 3 is shown a third embodiment in which a by-pass passageways are provided in the wall of the body as designated by the numerals 40, 41 and 42. Similar parts to those shown in FIG. 1 are designated by the same numerals in 300 series in order to abbreviate duplicated description in understanding the embodiment. In the position shown, a part of the pump flow from the inlet port 302 passes through annular grooves 321 and 319, to port 303 and the other regulated flow passes through by-pass 40, orifices 327 and 328, by pass 41 and 42, chamber 317 to port 304. The same result is obtained by the embodiment. Further description is considered to be abbreviated for completely understanding the embodiment.

Figure 4:
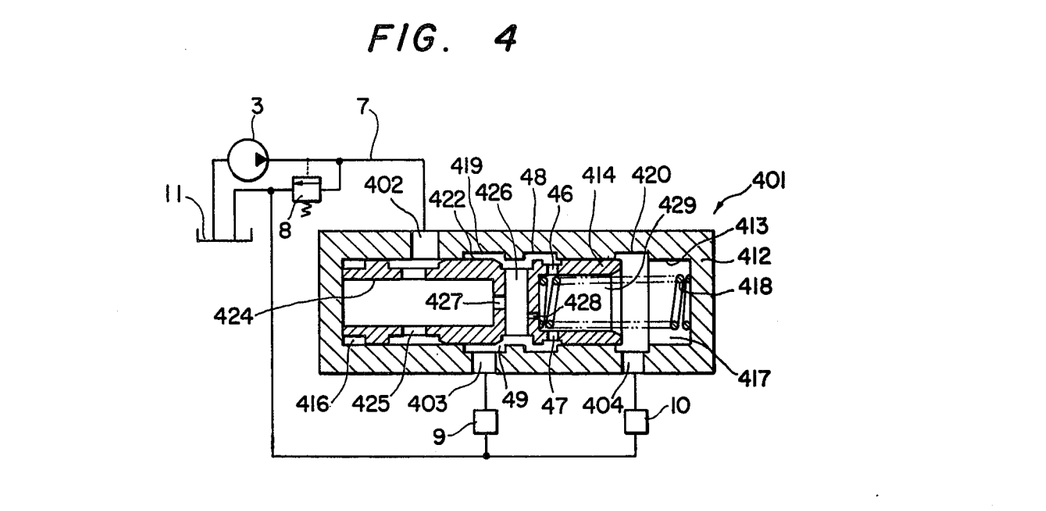
FIG. 4 shows a somewhat schematic longitudinal cross section of a still yet another embodiment of the invention, connected into a diagrammatically represented hydraulic systems for a vehicle.
Figure 4A:
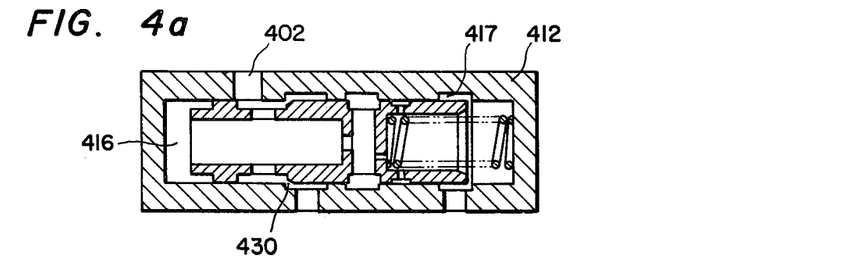
FIGS. 4a and 4b are respectively an axial cross sectional view of the flow divider shown in FIG. 4, showing respectively different positions.

In FIG. 4 is shown a fourth embodiment which is provided with an additional valve 45. Parts similar to those of the first embodiment in FIG. 1 are designated by the same numerals in 400 series in order to facilitate understanding the embodiment and to abbreviate duplicated descriptions. The valve 45 is formed of an annular groove in the internal face of the bore 413 and another annular groove 46 in the external face of the plunger 414. The groove 46 is connected through a small drilled passage 47 with the internal recess 429 of the plunger 414.

Figure 4B:
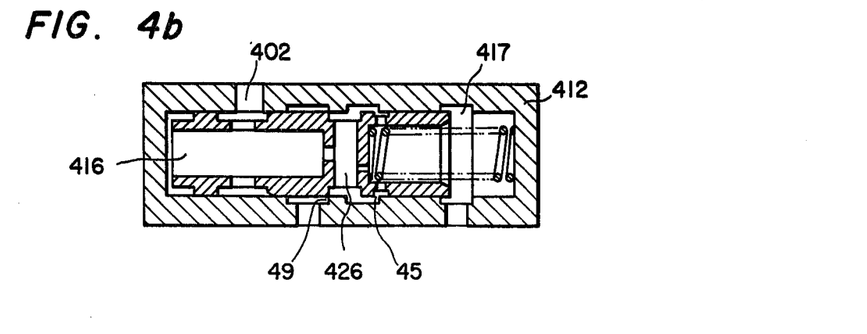

Assume that the system of device 10 is the known open center power braking booster which operates to restrict pump flow and thereby increase the pressure in fluid passing therethrough. When the device 10 is extremely actuated, the flow through port 404 momentarily ceases. The momentary cessation reduces the pressure drop across the orifice 428, and therefore the pressure difference which existed across the orifice is dissipated, causing the plunger 414 to move leftward. The restriction of the variable valve 430 is accordingly further increased up into complete closure. When the variable valve 430 is set about to be closed, the other variable valve 45 is gradually opened and the other variable valve 49 (FIG. 4b) is late opened as seen. In the position shown in FIG. 4b, the chamber 417 communicates with bore 426 through the opened valve 45 with no restriction of flow therethrough so that the pressure difference which existed across the orifice 428 just prior to this function has been completely dissipated, and chamber 417 and the bore 426 are identical in pressure. It follows that the pressure drop across the other orifice 427 is the same between both chambers 416 and 417. The plunger 414 is moved to the left a substantial distance, until the spring load decreases sufficiently to balance the force on plunger. It will be understood that in case of an extreme actuation of the system 10 to stop pump flow through port 404, a more or less regulated flow is ensured through port 403 in the same manner as the previously described embodiments sufficiently to operate the other system 9.

If the device 9 is also extremely actuated, causing further restriction in the flow, when the other system 10 is in the above described position and fluid flow through port 404 is stopped, pressure will rise in port 403 and in bore 426. The pressure difference across the orifice 427 therefore decreases with the rise in pressure. The decrease in pressure difference thence will have a tendency to decrease flow through the orifice 427 and causes the plunger 414 to move to the left a substantial distance until the spring load decreases to substantially balance the force on the plunger. Upon the movement of the plunger 414, the valve 49 further opens to thereby increase flow of fluid past the valve 49, namely past the orifice 427. This increased flow thence increases a force on the plunger against the spring 418 and resulting in rightward movement of the plunger, until it restores the former position which existed just prior to that extreme acutation of device 9.

It will be noted that a small regulated flow is available through port 403 in case of extreme actuation of the other system 10 as would stop flow through port 404, sufficiently to hold device 9 operative.

In case the valve 45 is not provided, there will be a fluid flow through the other orifice 428 upon leftward movement of plunger due to the situation described in the foregoing. This tends to create an additional pressure drop across the orifice 428, and accordingly results a pressure difference across the same. The pressure difference is apt to affect the pressure drop across the other orifice 427 in dependency upon which movement of the plunger or installed load of the spring is calculsted. In actual tests, provision of the valve 45 is found effective to prevent the plunger from fluttering which tends to be exhibited in case of no provision of the valve 45.

Figure 5:
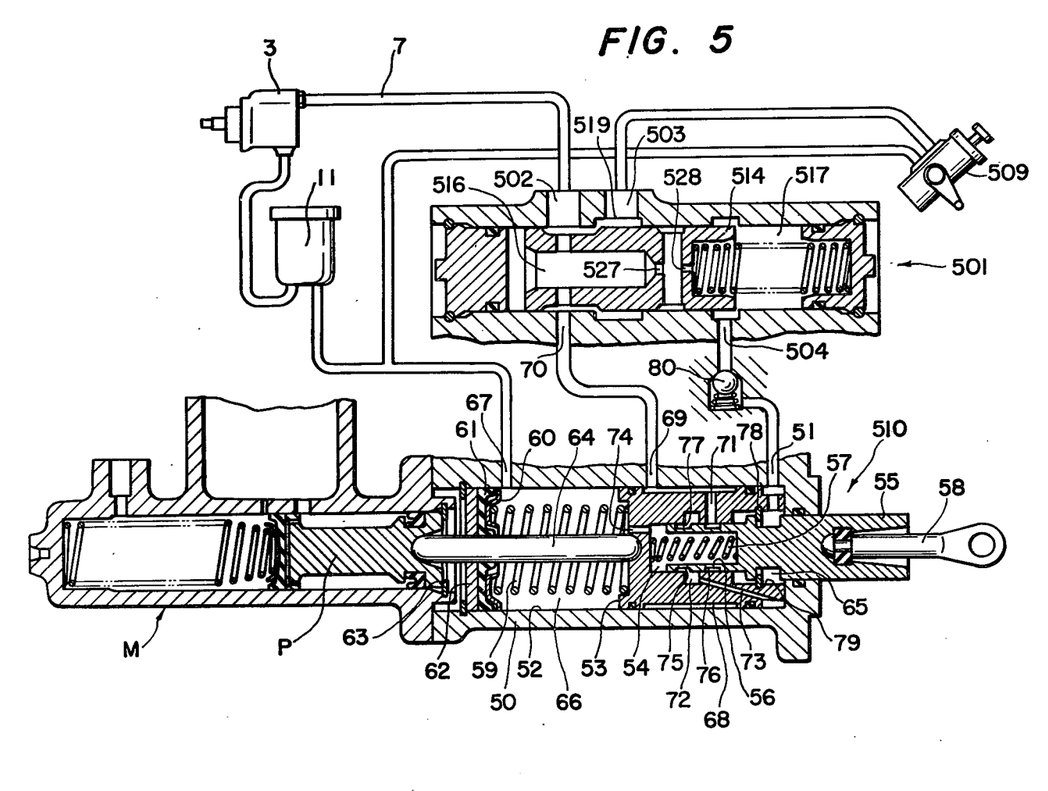
FIG. 5 shows also still yet further different embodiment of the invention in more practical form, connected into a powered braking booster and a diagrammatically represented powered steering mechanism.

In FIG. 5 is shown the fifth embodiment more actually embodying the invention. Parts similar to those shown in FIG. 1 are designated by the same numerals in 500 series in order to facilitate understanding the embodiment with no duplicated description.

The upper half of the FIG. 5 is allotted to a flow divider regulating valve according to the invention while the remainder is allotted to a power booster 510. The outlet port 504 is connected to an inlet port 51 of the booster 510 and the other outlet port 503 is connected to a power steering device 509 in the same manner as the first embodiment in FIG. 1.

Now returning to the detailed description of the booster, it is made up generally of a housing casting 50 which may be of a gray iron or other suitable material. The port 51 is shown as forming the mouth of a bore 52 which contains, in close fitting slidable relationship, a power piston 53 of generally cylindrical shape having a large internal cylindrical recess 54 receiving, also in close fitting slidable relationship, a valve element 55 also having a small internal cylindrical recess 56 containing a calibrated compressed spring 57. The spring bears at its both ends against the power piston 53 and the valve element 55 respectively so that they are normally urged toward separation from each other. The valve member or spool 55 is operatively connected through a linkage 58 with the known braking pedal (not shown) to be manually operated by the operator. A large compressed calibrated spring 59 bears at the right hand end against the power piston 53 and at the other end against a retainer 60 which is stopped by a ring 63 received in a corresponding groove in the internal face of the bore 52, across a seal 61 and a guide member 62. A connecting rod 64 is slidably received by the guide member 62 to transmit a force on the power piston 53 to the known power piston P of the ordinary brake master cylinder M which further description thereof is considered to be unnecessary, because of its conventional structure.

The several parts described above divide the housing 50 into chambers. The first of these is a pressurizing chamber 65 defined by the right hand end of the power piston 53 and the right hand internal end face of the bore 52 of the housing. This chamber is in communication with the inlet port 51 of housing 50. The second of these chambers is a spring containing chamber 66 positioned between the power piston 53 and the seal 61. This chamber is in communication with the reservoir port 67. The last chamber is an annular broad groove 68 in the external face of the piston 43 which communicates through a port 69 with the chamber 516 of the flow divider 501 through its port 70, and also with the internal recess 54 through a radial path 71. The internal cylindrical recess 54 further communicates through an annular groove 72 and inclined drilled passage 73 with the pressurizing of power chamber 65 and further with the left hand large spring containing cavity 66 through a passage 74 to normally be held at atmospheric pressure. The spool 55 has at the left hand portion of a pair of separated annular grooves 75 and 76. The groove 75 is in communication through a small drilled passage 77 with the internal cylindrical recess 56. The spool 55 is normally spring biased toward attachment with a ring 78 engaging a corresponding annular groove in the internal face of the larger cylindrical recess 79, so that the power piston 53 and the spool 55 occupy the positions shown respectively in their rest position.

From the description in the foregoing regarding the other embodiments, the function of the flow divider 501 will be apparent. A regulated fluid flow is available through the outlet port 504 while the remainder of pump flow continues through the other port 503 in the same manner as those of the other embodiments. It should be understood that the operation of either one of the devices 509 or 510 does not in any way alter or affect the behavior of the other.

In case of sudden actuation of the steering device 509, under the condition in which the substantial fluid flow through the port 504 is stopped because of the unusual extreme actuation of the device 510, the more or less regulated flow is ensured through the port 503.

Further description regarding operation is considered to be abbreviated by the intended symbolizing with the same numerals used in 500 series.

The following description is therefore concentrated upon operation of the power booster 510. It will be seen that when the device 510, the hydraulic power braking booster, is in the position shown, there will be a relatively free flow of hydraulic fluid through the mechanism 510 for returning of fluid from the flow divider port 504 to the reservoir 11. The passageway through which the fluid flows contains 51, power chamber 65, inclined passage 73, annular groove 72, drilled passage 77, small internal recess 56, large internal recess 54, small drilled passage 74, spring containing cavity 66, and outlet port 67 to the reservoir 11. Normally the valve member 55 is retained in the position shown by means of the springs 57 and 59 and a pair of stopper rings 78 and 63, to limit the right hand movement of the spool 55 to the position shown.

When the valve member 55 is moved in the left hand direction on movement of the brake pedal, communication between the annular grooves 77 and 72 is gradually blocked by the lands neighboring them, so thereby increase restriction of the fluid flow past the grooves 72 and 77, internal recess 56 and 54, and drilled passage 74 to the reservoir chamber 66. This causes a pressure build up in the power chamber 65, to drive the power piston 55 in a left hand direction.

As the requirement for braking of the vehicle increases, the valve member 55 is moved further forward in a left hand direction so that there is a steady increase in pressure in power chamber 65 to meet the braking requirement to power drive the piston 53 in a left hand direction with a resultant increase in pressure to the power piston of the brake master cylinder so that the required braking power is effected.

During the operation, pressure built up within the chamber 65 acts on an annular acting area which corresponds to the cross sectional area difference between the diametrically larger portion and the smaller portion of the spool 55. Such a force acting upon the annular area is to be sensed by the operator to have him become aware of the braking force to be controlled.

In case of sudden or quick depression of the braking pedal, the spool 55 tends to be moved forward an unusally greater distance because of an improportionally inferior pressure rise within the chamber 65 which is to be caused by the restriction of flow by the spool 55. The final result of this changing relationship will be that the annular grooves 72 and 75 come into full closure with each other and fluid flow past them will be stopped. Alternatively, the groove 72 comes into communication with the other annular groove 76 and in turn with the drilled passage 71 so that the power chamber 65 receives pump flow through the shorter cut which contains, going from, reversely, chamber 65 to the outlet port 70 of flow divider, the following components, inclined drilled passage 73, annular grooves 72 and 76, drilled passage 77, broad annular groove 68, and inlet port 69 to the port 70. Pressure rise within chamber 65 promptly results due to the delivery of fluid through the shorter cut from the flow divider. This is effective to achieve promptly responsibility of the booster for the safety purpose.

With the proportional pressure rise within chamber 65, the unusual locational relationship between both annular grooves 72 and 75 which existed just prior to the pressure rise in chamber 65 will be dissipated, and the spool 55 and power piston 53 come into the normal locational relationship.

It should be noted that during the above mentioned function, pressure in chamber 65 is held at a higher level than that in chamber 517 of flow divider, and provision of a check valve 80 in front of port 51 is for the purpose of blocking reverse flow to the flow divider.

What is claimed is:

1. A flow divider regulator valve comprising:
   a housing having a fluid inlet, first and second outlets and a bore communicating the inlet with the outlets;
   a plunger means closely fitting and slidable in said bore dividing th latter into first and second chambers;
   said inlet and said first outlet being in fluid communication with said first chamber;
   said second outlet being in fluid communication with said second chamber;
   orifice means comprising first and second orifices disposed in a fluid flow from said first chamber to said second chamber, said first orifice being disposed upstream of said second orifice such that a fluid flow from said inlet to said second outlet passes sequentially through said first and second orifices, said first orifice having a larger cross-section than said second orifice;
   said orifice means providing metered fluid flow from said inlet to said first outlet and from said inlet to said second chamber;
   a first valve means on said plunger means for controlling fluid flow from said inlet to said first outlet through said first chamber;
   a second valve means on said plunger means for controlling fluid flow from said inlet to said first outlet through said first orifice;
   a third valve means on said plunger means for controlling fluid flow from said second chamber to said second outlet; and
   a resilient member disposed to normally urge said plunger means to a postion in which said first valve means is closed and said second and third valve means are open, in the absence of fluid pressure at said inlet.

2. A valve as set forth in claim 1 wherein said first and second orifices are located on said plunger means.

3. A valve as set forth in claim 2 wherein said third valve means is located downstream of said orifice means.

4. A valve as set forth in claim 1 wherein said first and second orifices are incorporated in a wall portion of said housing.

5. A valve as set forth in claim 1 wherein a fourth valve means is further provided for permitting free fluid communication between said second chamber and said first outlet when the said inlet and first outlet are connected through said first orifice.

6. A valve as set forth in claim 1 wherein a third outlet is further provided in communication with said first chamber independently of said first outlet for discharging unrestricted flow of fluid bypassing said orifices and said first, second and third valve means.

7. A valve as set forth in claim 1 wherein a space is defined between said first and second orifices to provide a passage of fluid from said inlet, through said first orifice, and to said first outlet in a manner bypassing said first valve means.

8. In a valve comprising:
   a housing having a fluid inlet, first and second outlets and a bore communicating the inlet with the outlets;
   a plunger means closely fitting and slidable in said bore dividing the latter into first and second chambers;
   said inlet and said first outlet being in fluid communication with said first chamber;
   said second outlet being in fluid communication with said second chamber;
   first and second orifices, said first orifice providing metered fluid flow from said inlet to said first outlet, and said second orifice providing metered fluid flow from said inlet to said second chamber;
   a pair of valve means on said plunger means to provide fluid flow from said inlet to said first outlet through said first chamber and said first orifice,
   a third valve means on said plunger means for controlling fluid flow from said second chamber to said second outlet; and
   a fourth valve means to permit free fluid flow from said second chamber to said first outlet when said inlet and said first outlet are connected across said first orifice.

9. A flow divider regulator valve comprising:
   a housing having a fluid inlet, first and second outlets and a bore communicating the inlet with the outlets;
   a plunger means closely fitting and slidable in said bore dividing the latter into first and second chambers;
   said inlet and said first outlet being in fluid communication with said first chamber;

said second outlet being in fluid communication with said second chamber;

first and second orifices, said first orifice providing metered fluid flow from said inlet to said first outlet, and said second orifice providing metered fluid flow from said inlet to said second chamber;

said first orifice being positioned such that a pressure drop thereacross from said inlet to said first outlet produces forces urging said piston means in a first direction, and said second orifice being positioned such that a pressure drop thereacross from said inlet to said second chamber produces forces urging said piston means in said direction;

a first valve means on said plunger means for controlling fluid flow from said inlet to said first outlet through said first chamber;

a second valve means on said plunger means for controlling fluid flow from said inlet to said first outlet through said first orifice;

a third valve means on said plunger means for controlling fluid flow from said second chamber to said second outlet; and a resilient member disposed to normally urge said plunger means to a position in which said first valve means is closed and said second and third valve means are open, in the absence of fluid pressure at said inlet.

* * * * *